United States Patent
Hangmann et al.

(10) Patent No.: US 6,326,879 B1
(45) Date of Patent: Dec. 4, 2001

(54) THERMAL SWITCH ARRANGEMENT FOR ELECTROMAGNETIC COILS

(75) Inventors: Werner Hangmann, Oerlinghausen; Matthias Paul, Hiddenhausen; Norbert Krogmeier, Bielefeld; Walter Wistinghausen, Detmold, all of (DE)

(73) Assignee: Hanning Elektro-Werke GmbH & Co. KG, Oerlinghausen (DE)

(*) Notice: Subject to any disclaimer, the term of this patent is extended or adjusted under 35 U.S.C. 154(b) by 0 days.

(21) Appl. No.: 09/441,868

(22) Filed: Nov. 17, 1999

(30) Foreign Application Priority Data

Nov. 17, 1998 (DE) ............................................. 198 52 929

(51) Int. Cl.⁷ ........................... H02K 11/00; H02H 5/04; H01H 37/04
(52) U.S. Cl. ..................... 337/381; 337/380; 337/112; 337/113; 361/25; 361/26; 361/105; 310/68 C
(58) Field of Search ........................ 337/20, 112, 113, 337/372, 380, 381, 398; 310/68, 68 C, 71, 91, 260, 270; 361/23, 25, 26, 37, 38, 105, 124; 318/471; 439/621, 622

(56) References Cited

U.S. PATENT DOCUMENTS

| | | | |
|---|---|---|---|
| 3,842,297 | * | 10/1974 | Pleiss, Jr. et al. ................ 310/68 C |
| 3,959,675 | * | 5/1976 | Lautner et al. .................... 310/68 C |
| 4,112,405 | * | 9/1978 | Joseph ..................................... 337/4 |
| 4,132,913 | * | 1/1979 | Lautner et al. .................... 310/68 C |
| 4,163,913 | * | 8/1979 | Barratt .................................. 310/91 |
| 4,181,393 | * | 1/1980 | Lill ........................................ 339/98 |
| 4,186,318 | * | 1/1980 | Anderson ........................... 310/68 C |
| 4,188,553 | * | 2/1980 | Wheaton ............................. 310/68 C |
| 4,250,419 | * | 2/1981 | Zolman ............................... 310/68 C |
| 4,251,911 | * | 2/1981 | Reynolds et al. ..................... 29/605 |
| 4,476,407 | * | 10/1984 | Hildebrandt et al. ................. 310/71 |
| 5,463,522 | * | 10/1995 | Van Wagener et al. ............. 361/103 |

FOREIGN PATENT DOCUMENTS

| | | |
|---|---|---|
| 9004943 | 11/1991 | (DE) . |
| 4142180 | 7/1993 | (DE) . |
| 4243845 | 6/1994 | (DE) . |
| 57-199453-A * | 12/1982 | (JP) ................... H02K/11/00 |
| 7-222403-A * | 8/1995 | (JP) ................... H02K/11/00 |
| 7-336923-A * | 12/1995 | (JP) . |
| 10-271766-A * | 10/1998 | (JP) ................... H02K/11/00 |

* cited by examiner

Primary Examiner—Leo P. Picard
Assistant Examiner—Anatoly Vortman
(74) Attorney, Agent, or Firm—Richard M. Goldberg

(57) ABSTRACT

A thermal switch arrangement for electromagnetic coils of electric motors, including at least one coil, which has a winding (52, 54) and a coil former (30, 48) in the form of a winding core (32), which is enclosed by two end flanges (36, 38; 56, 58, 60, 62), and flat plugs (26, 28; 74, 76, 78), which are connected with the two ends of the winding and/or the connections of a thermal switch (80), assigned to the winding, and are inserted and locked in pockets (40, 42; 64, 66) in or at at least one end flange (36, 38; 56, 58, 60, 62) from the peripheral edge of the latter and locked. Two tags (82, 84) of the thermal switch (80) enter the pockets (40, 42; 64, 66) of the flat plug (74, 78) from the inner surface of the one end flange (36, 60).

17 Claims, 5 Drawing Sheets

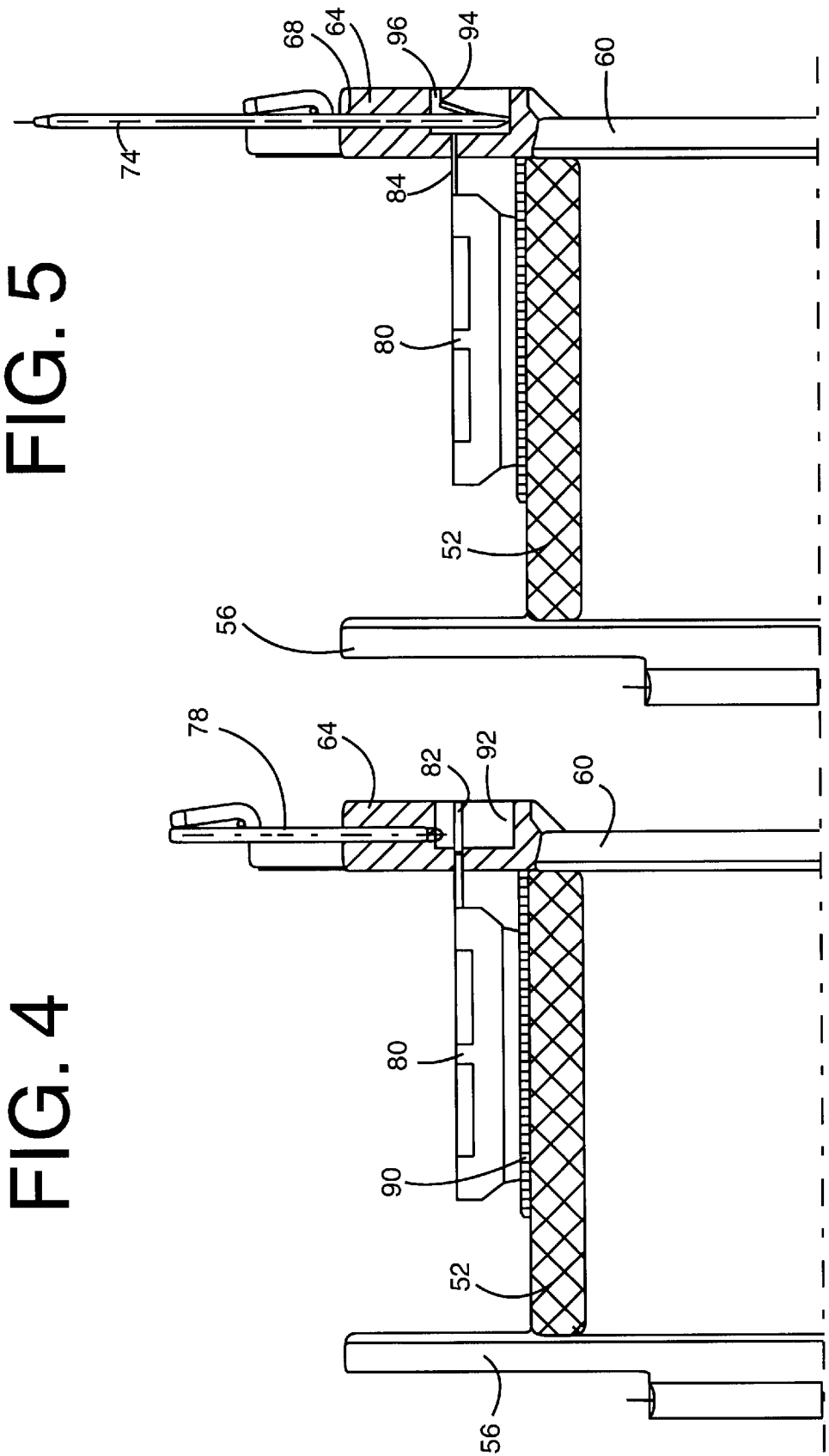

THERMAL SWITCH ARRANGEMENT FOR ELECTROMAGNETIC COILS

BACKGROUND OF THE INVENTION

The invention relates to a thermal switch arrangement for electromagnetic coils, particularly of electric motors.

In many cases, electromagnetic coils are protected against excessive temperatures in the winding with the help of a thermal switch, which is also referred to as a "safety temperature limiter". Excessive temperature in the winding of the coil former, which takes up the winding, or perhaps of a motor in its totality, could lead to damage or destruction of the motor or its parts. Moreover, overheating the motor also implies the danger of a fire. For this reason, the thermal switches are disposed and connected at or on the coil in such a manner, that they interrupt the current in the winding when a specified temperature is exceeded.

Usually, the thermal switches are connected in series with the windings. This can be accomplished, for example, owing to the fact that the thermal switch is soldered with one of its tags to a flat plug of the winding, which is fastened to the coil former, while the other end of the winding wire is soldered to the other tag of the thermal switch. The production of the two soldered sites represents a timeconsuming interruption of the installation of the coil, which not only delays the production, but also makes it more expensive. If soldering is carried out in the immediate vicinity of the coil, it is also possible for the soldering tin to reach the surface of the winding, damaging it. In particular, the insulation of the individual copper wires, generally enameled copper wire, may be damaged.

SUMMARY OF THE INVENTION

It is therefore an object of the invention to simplify the process of attaching a thermal switch to a coil and to make it less expensive.

An inventive thermal switch arrangement is characterized in that the two tags of the thermal switch enter the pockets of the flat plug from the inner surface of the one end flange.

Since the flat plugs are pushed from the edge of the end flange in question into the insertion slots in the pockets and the tags enter the pockets from the inner surface of the end flange facing the winding, the paths of the tags and of the flat plugs cross essentially at an angle of 90°. This fact can be used for the purpose of initially pushing in or forcing in the tags and then the flat plugs. At the same time, the penetrating flat plugs bend the relatively pliable tags at right angles, so that the tags are fixed.

If the inlet openings, which produce the connection to the insertion slots from the inner surface of the end flange, are disposed at a small distance from the peripheral surface of the winding, the thermal switch, after the tags are pushed into these inlet openings, is automatically in a position on or close to the peripheral surface of the coil.

Between the peripheral surface of the winding and the thermal switch, a heat-resistant intermediate layer may be disposed, or the thermal switch can also be enveloped as a whole, in that, for example, a heat-resistant tube material is pushed over the thermal switch.

BRIEF DESCRIPTION OF THE DRAWINGS

In the following, preferred examples of the invention are explained in greater detail by means of the attached drawing, in which FIG. 4 shows a vertical, longitudinal section through the coil, shown at the left in FIG. 3, in the region of a first tag before the flat plug is pushed into a pocket, FIG. 5 shows a vertical, longitudinal section corresponding to FIG. 3, however, with a cutting plane, which passes through a second tag of a thermal switch, after the insertion of the flat plug.

DETAILED DESCRIPTION

Figure 1:
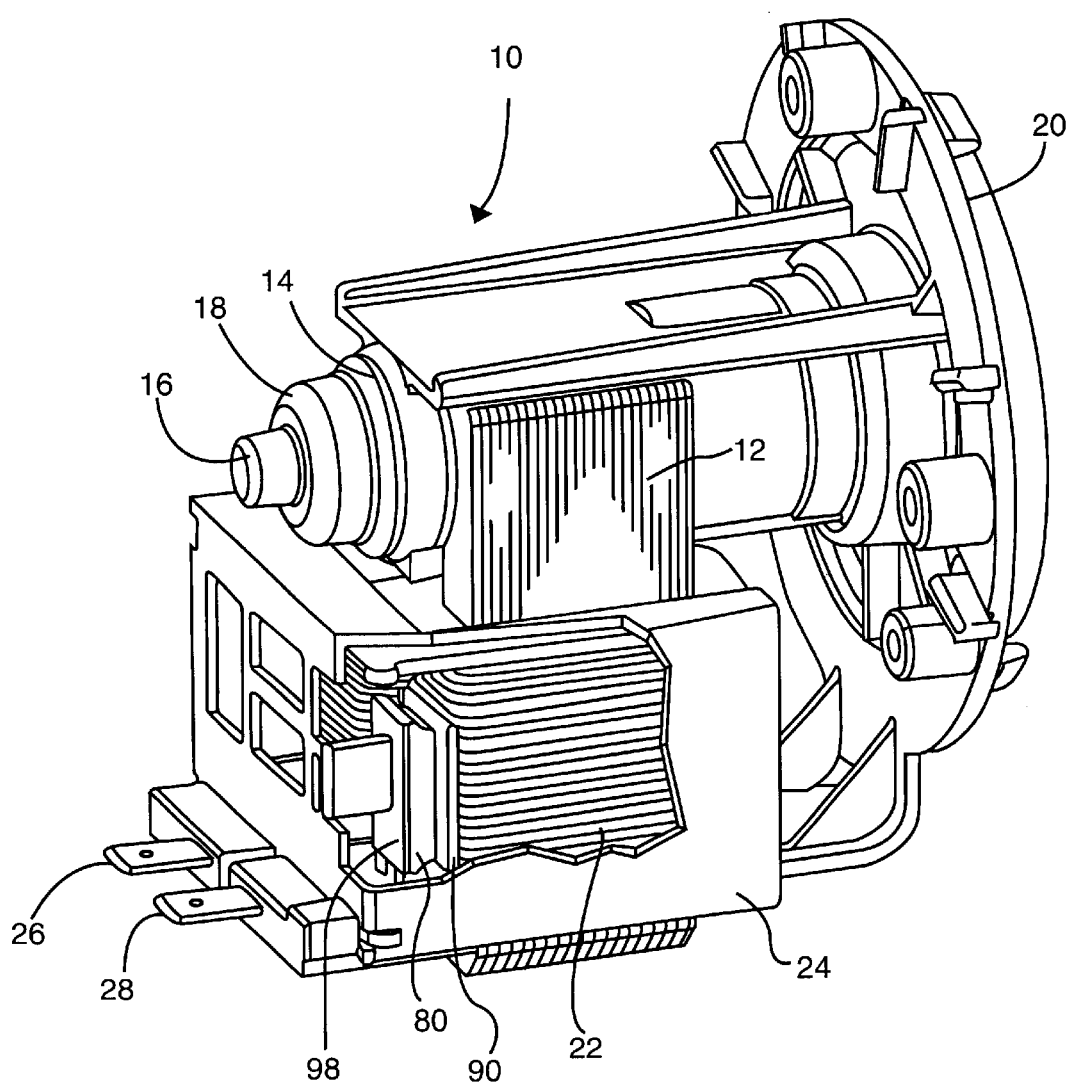
FIG. 1 shows a perspective representation of an electric motor in the form of a single-phase synchronous motor.

FIG. 1 is a perspective representation of an electric motor 10, which is to be formed in this example by a single-phase synchronous motor. The electric motor 10 has a stator 12 in the form of two stator laminations, which are combined in the shape of a U and, at their upper, open end, embrace a sleeve 14, in which a rotor, fastened on a shaft 16, is rotatably mounted. In practice, the shaft and the rotor lie behind a cover, so that they are not visible, for example, in FIG. 1. On the right side of FIG. 1, an end plate 20 is indicated, at the rear of which the shaft 16 enters in a manner not shown and is connected with the following device, such as a pump or the like, which is to be driven.

On the two open upper ends of the U-shaped stator 12, coils 22 are pushed, which have windings of enameled copper wire or the like and are wound on coil former halves, which will be dealt with in greater detail later on. The coils 22 otherwise are surrounded by a housing 24, which also will be dealt with once again later on. Two flat plugs 26, 28, which form the connections of the coil arrangement to the electrical network, come out of the housing.

Figure 2:
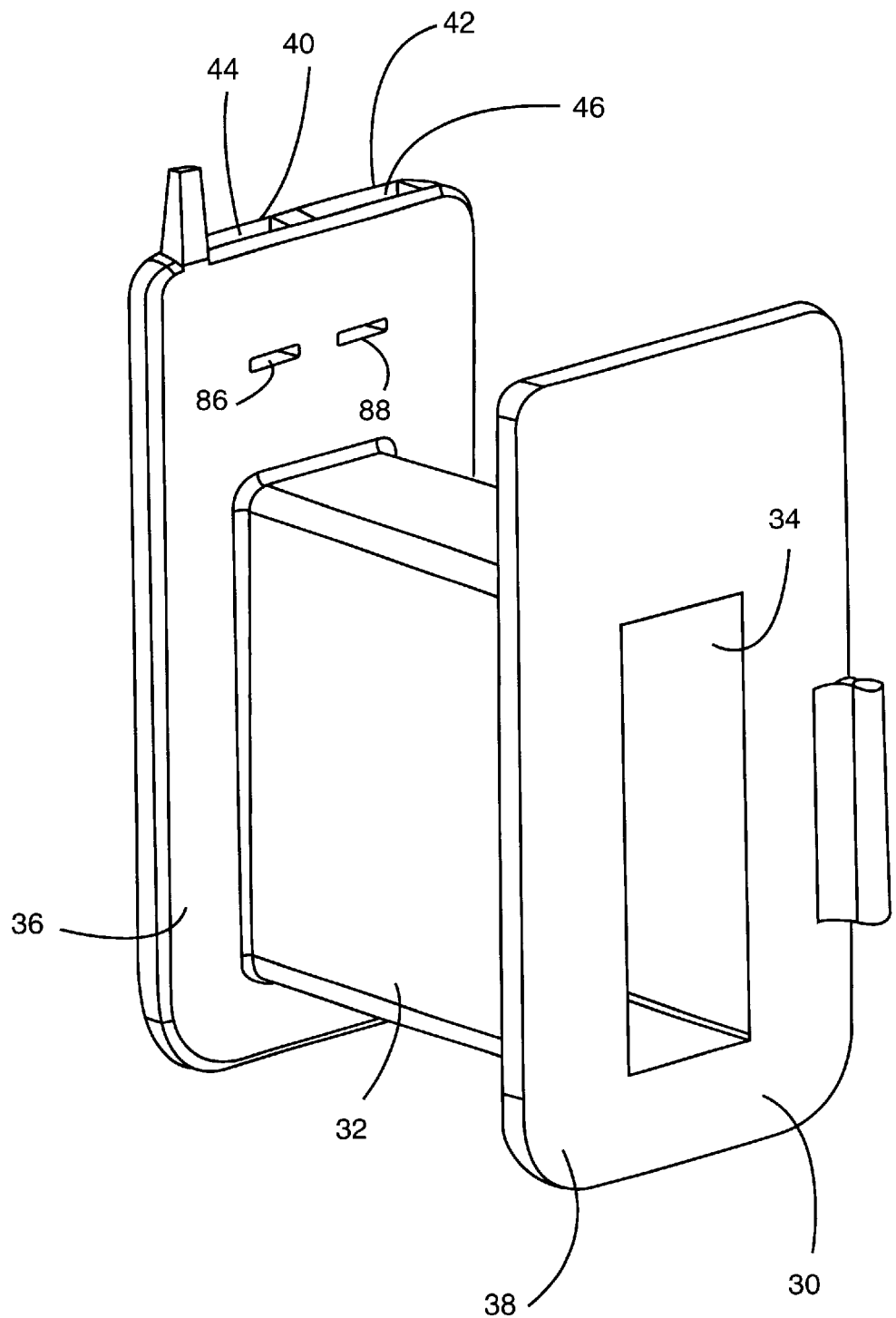
FIG. 2 shows a perspective representation of a coil former half of the motor without a winding.

FIG. 2 shows a perspective representation of a coil former half 30 without a winding. The coil former half 30 comprises a hollow winding core 32, which is rectangular in cross section and has a continuous passage 34 in the interior, which is also rectangular in cross section. The winding core 32 is bounded at both ends by end flanges 36, 38, which also have an essential rectangular outline. On the rear side, which is concealed in FIG. 2, the end flange 36, which is further to the rear in FIG. 2, has pockets 40, 42, into which the insertion slots 44, 46 for flat plugs 26, 28, which are vertical in FIG. 2 and are already shown in FIG. 1, enter from above. The flat plugs 26, 28 are present in two different shapes, which will be dealt with once again subsequently.

Figure 3:
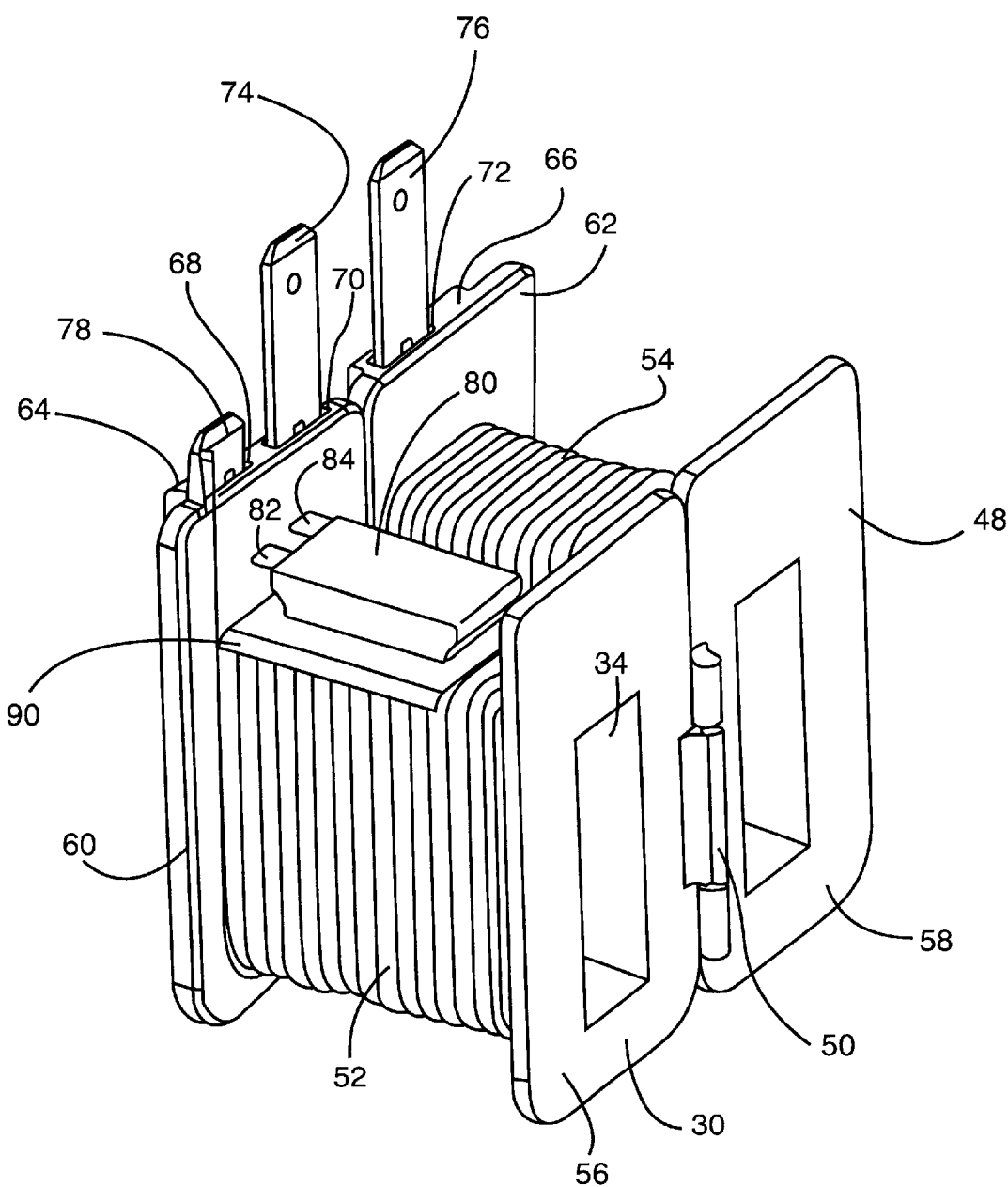
FIG. 3 shows a perspective representation of the two coil former halves of the motor with a winding and a thermal switch.

FIG. 3 is a perspective representation of a coil arrangement with two coil former halves 30, 48, which are connected pivotably by a hinge 50. This hinge 50 makes it possible to push the two coil former halves 30, 48 in the stretched coaxial position onto a common winding spindle for winding jointly and, after the winding, to fold them back into the position shown in FIG. 3, in which they can be mounted on the stator 12. In FIG. 3, on the two winding cores not shown, there are windings 52, 54 of enameled copper wire or the like. The two coil former halves 30 and 48 in each case have end flanges 56, 58, which are at the front in FIG. 3, and rear and end flanges 60, 62. Corresponding to the end flange 36 of FIG. 2, the rear end flanges 60, 62 of FIG. 3 have, on their rear concealed side, pockets 64, 66, into which vertical insertion slots 68, 70, 72 enter from the upper edge.

Into these insertion slots, initially two longer flat plugs 74, 76 and, furthermore, a shorter flat plug 78 are inserted. The longer flat plugs 74, 76 connect the coil arrangement to the electrical network. The shorter flat plug 78 is an intermediate element, which connects a winding end and a thermal switch 80. The thermal switch 80 has, according to FIG. 3, the shape of a flat cuboid, from the one narrow edge of which two flat tags 82, 84 emerge. The tags 82, 84 are pushed into inlet openings 86, 88 which, according to FIG. 2, are in the inner surface of the rear end flange 36 and 80 respectively and create an opening to the vertical insertion slots 44, 46 and 68, 70 respectively. The tags 82, 84 thus enter these transversely to the insertion slots.

Figure 6:
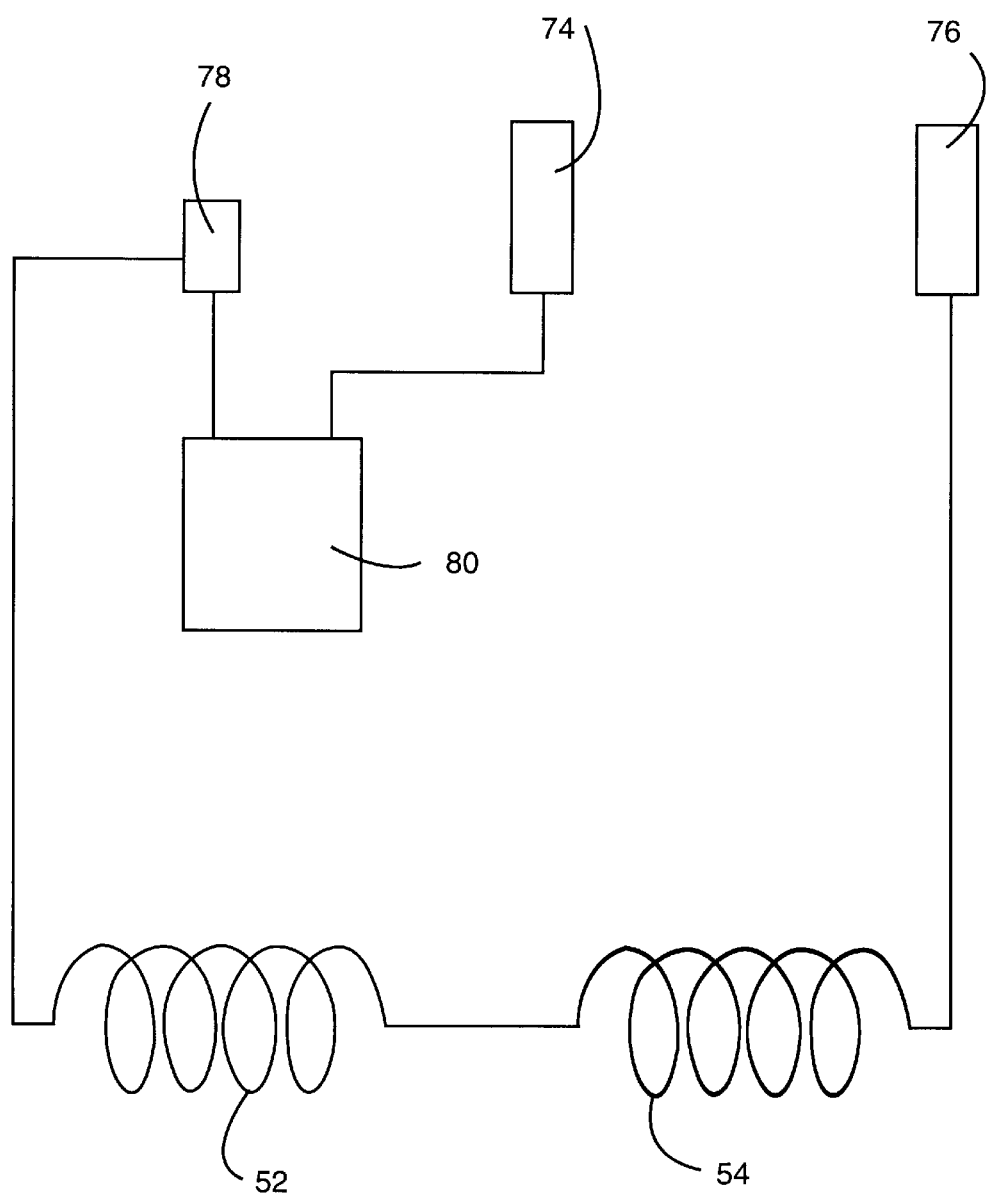
FIG. 6 shows a diagrammatic circuit diagram of the inventive thermal switch arrangement of FIGS. 3 to 5.

The circuit is constructed in FIG. 3 in such a manner, that one end of the winding wire is connected with the shorter flat plug 78, the latter produces a connection with the left tag 82 of the thermal switch 80, the right tag 84 of which is connected with the longer flat plug 74, and finally, the other end of the winding wire, which is not shown, is connected with the other longer flat plug 76 (see also FIG. 6). In this way, the thermal switch 80 is connected with both windings in series. Between the thermal switch 80 and the front winding 52, there is an intermediate layer 90 of a heat-resistant material, that can be glued, for example, as an adhesive strip to the peripheral surface of the winding 52.

In a vertical, longitudinal section through the left coil former half in FIG. 3, FIG. 4 illustrates the establishment of the connection between the thermal switch 80 and the shorter flat plug 78. In particular, the cutting plane of FIG. 4 runs through the tag 82 of the thermal switch 80, which is at the left in FIG. 3. The already previously used reference symbols are entered in FIG. 4. Through the inlet openings 86, the tag 82 enters the vertical insertion slot 68, which in this region ends in a recess 92, which is open towards the rear side of the end flange 60. When initially the tag 82 is pushed into the inlet opening 86 and the flat plug 78 is subsequently pressed from above in the downwards direction in FIG. 4, the tag 82 is bent over downward at right angles by the flat plug 78, as is illustrated in FIG. 5 by the example of the other tag 84. The cutting plane of FIG. 5 is thus offset slightly parallel to that of FIG. 4.

At the flat plug 74 in FIG. 5, it is shown that, at the leading end of the flat plug, barbs 94 are provided, which spread out in the recess 96 provided in the pocket on the rear side in FIG. 5 and prevent the retraction of the flat plug 74. The tag 84 is bent over downwards at right angles and accordingly is held between the bottom of the recess 96 and the flat plug 74. After they are bent over at tight angles, the tags can no longer be pulled back.

Subsequently, FIG. 1 shall be dealt with once again. For the embodiment shown, the coils 22 are surrounded by a box-shaped housing 24. This housing 24 is shown in a partially broken open form. In the region of the thermal switch 80, there is, on the inside of the housing 24, a pressure plate 98, which presses the thermal switch 80 in a defined manner against the peripheral surface of the coil 22. In this way, a defined contact is brought about between the thermal switch and the coil and this contact provides for constant measurement results.

FIG. 6 shows a diagrammatic circuit diagram of the series connection, achieved pursuant to the invention. The two connections of the coil arrangement to the electrical network are the longer flat plugs 74, 76. The thermal switch 80 is connected between the longer flat plug 74 and the shorter flat plug 78, which in turn is connected with one end of the winding wire of the windings 52, 54.

What is claimed is:

1. A thermal switch arrangement for electromagnetic coils of electric motors, with at least one coil, which has a winding and a coil former in the form of a winding core, which is enclosed by two end flanges, with flat plugs, which are connected with one of (a) two ends of the winding and (b) connections of a thermal switch assigned to the winding, and which are inserted and locked in pockets at a peripheral edge of at least one end flange, the thermal switch arrangement comprising two tags of the thermal switch which enter the pockets of the flat plug from an inner surface of the at least one end flange.

2. The thermal switch arrangement of claim 1, wherein the tags of the thermal switch cross an insertion slot in the pockets, which is provided for receiving the flat plugs, and can be deformed by pressing in the flat plugs.

3. The thermal switch arrangement of claim 1, further comprising a heat-resistant intermediate layer disposed between the thermal switch and a peripheral surface of the winding.

4. The thermal switch arrangement of claim 3, wherein the intermediate layer is glued to the peripheral surface of the winding.

5. The thermal switch arrangement of claim 4, wherein the intermediate layer includes a bonding sheet.

6. The thermal switch arrangement of claim 2, wherein the insertion slots of the flat plugs, at the level of inlet openings for the tags of the thermal switch, expand into a recess open towards an outside of the end flange which receives the flat plugs.

7. The thermal switch arrangement of claim 1, further comprising a contacting device for pressing the thermal switch against a surface of the winding.

8. The thermal switch arrangement of claim 7, wherein the winding is located within a housing and the contacting device is disposed at an inner wall of the housing.

9. The thermal switch arrangement of claim 2, further comprising a heat-resistant intermediate layer disposed between the thermal switch and a peripheral surface of the winding.

10. The thermal switch arrangement of claim 3, wherein the insertion slots of the flat plugs, at the level of inlet openings for the tags of the thermal switch, expand into a recess open towards an outside of the end flange which receives the flat plugs.

11. The thermal switch arrangement of claim 4, wherein the insertion slots of the flat plugs, at the level of inlet openings for the tags of the thermal switch, expand into a recess open towards an outside of the end flange which receives the flat plugs.

12. The thermal switch arrangement of claim 5, wherein the insertion slots of the flat plugs, at the level of inlet openings for the tags of the thermal switch, expand into a recess open towards an outside of the end flange which receives the flat plugs.

13. The thermal switch arrangement of claim 2, further comprising a contacting device for pressing the thermal switch against a surface of the winding.

14. The thermal switch arrangement of claim 3, further comprising a contacting device for pressing the thermal switch against the surface of the winding.

15. The thermal switch arrangement of claim 4, further comprising a contacting device for pressing the thermal switch against the surface of the winding.

16. The thermal switch arrangement of claim 5, further comprising a contacting device for pressing the thermal switch against the surface of the winding.

17. The thermal switch arrangement of claim 6, further comprising a contacting device for pressing the thermal switch against a surface of the winding.

* * * * *